US012428289B2

(12) United States Patent
Falkemo et al.

(10) Patent No.: US 12,428,289 B2
(45) Date of Patent: Sep. 30, 2025

(54) ADJUSTABLE STIRRUP

(71) Applicant: Sakander AB, Gotlands Tofta (SE)

(72) Inventors: Karin Falkemo, Gotlands Tofta (SE); Anders Falkemo, Gotlands Tofta (SE); Sanna-Marie Pettersson, Visby (SE)

(73) Assignee: Sakander AB, Gotlands Tofta (SE)

( * ) Notice: Subject to any disclaimer, the term of this patent is extended or adjusted under 35 U.S.C. 154(b) by 0 days.

(21) Appl. No.: 18/270,410

(22) PCT Filed: Nov. 25, 2022

(86) PCT No.: PCT/EP2022/083374
§ 371 (c)(1),
(2) Date: Jun. 29, 2023

(87) PCT Pub. No.: WO2023/110372
PCT Pub. Date: Jun. 22, 2023

(65) Prior Publication Data

US 2024/0317571 A1 Sep. 26, 2024

(30) Foreign Application Priority Data

Dec. 13, 2021 (SE) .................................... 2151523-4

(51) Int. Cl.
*B68C 3/00* (2006.01)
*B68C 3/02* (2006.01)

(52) U.S. Cl.
CPC ........ *B68C 3/02* (2013.01); *B68C 2003/0033* (2013.01); *B68C 2003/0066* (2013.01)

(58) Field of Classification Search
None
See application file for complete search history.

(56) References Cited

U.S. PATENT DOCUMENTS

| | | | | |
|---|---|---|---|---|
| 33,930 | A | 12/1861 | Eagle | |
| 5,794,419 | A | 8/1998 | Cohen | |
| 6,089,004 | A * | 7/2000 | Hsi-Chang ................ | B68C 3/02<br>54/49 |
| 9,212,044 | B2 * | 12/2015 | Nettles ...................... | B68C 3/00 |

(Continued)

FOREIGN PATENT DOCUMENTS

| | | | |
|---|---|---|---|
| DE | 3239993 | A1 | 5/1984 |
| DE | 102009003963 | B3 | 4/2010 |

(Continued)

OTHER PUBLICATIONS

International Search Report and Written Opinion received for PCT Patent Application No. PCT/EP2022/083374, mailed on Feb. 16, 2016, 12 pages.

(Continued)

*Primary Examiner* — Joshua J Michener
*Assistant Examiner* — Henry Hooper Mudd
(74) *Attorney, Agent, or Firm* — MEDLER FERRO WOODHOUSE & MILLS PLLC

(57) ABSTRACT

A stirrup arranged to be adjusted to an individual rider of a horse is provided. The stirrup includes a stirrup support bracket and a foot tread. The adjustable stirrup is provided with a stirrup angle adjustment arrangement, arranged to adjust the stirrup in one or more of an x-, y- or z-axis direction. A stirrup leather mounting part is arranged to receive the lower end sling of a stirrup leather.

11 Claims, 4 Drawing Sheets

(56) References Cited

U.S. PATENT DOCUMENTS

| | | | | |
|---|---|---|---|---|
| 2010/0162670 | A1 * | 7/2010 | Bostock | B68C 3/02 54/49 |
| 2017/0297894 | A1 * | 10/2017 | Fournier | B68C 1/18 |
| 2019/0241424 | A1 | 8/2019 | Maloigne | |

FOREIGN PATENT DOCUMENTS

| | | | |
|---|---|---|---|
| DE | 202021002257 | U1 | 8/2021 |
| EP | 0796816 | A1 | 9/1997 |
| EP | 3521240 | A1 | 8/2019 |
| GB | 1458742 | A | 12/1976 |

OTHER PUBLICATIONS

Canadian Office Action received in corresponding application CA 3203860 mailed Aug. 1, 2025.

* cited by examiner

ADJUSTABLE STIRRUP

CROSS-REFERENCE TO PRIOR APPLICATIONS

This application is a § 371 National Stage Application of PCT International application No. PCT/EP2022/083374 filed Nov. 25, 2022, which claims priority to Swedish Patent Application No. 2151523-4 filed Dec. 13, 2021, each of which is incorporated herein their entirety.

TECHNICAL FIELD

Embodiments herein relates in general to stirrups for horse riding, and especially to an adjustable stirrup arranged to be adjusted to the individual rider of a horse.

BACKGROUND

In horse riding, the balance and the position of the rider is of high importance. To work together harmoniously, both horse and rider need to have a good balance. For riders who do not have a good balance it is difficult to follow a horse's motion. Therefore, unexperienced riders tend to stay on a horse by gripping with their calves, gripping with their thighs, or hanging on the reins.

For more experienced riders, the rider's impact on the horse is highly depending on the balance of the rider. It has been the that the rider cannot have control over the horse's balance until having control over the own balance. When the rider is balanced, the horse is balanced, and the rider is the leader of the equipage controlling the horse's length of step, speed, rhythm, and direction. Riding in all disciplines requires that the rider with his body gives signals to the horse to either perform a certain dressage movement, turn towards an obstacle or jump over an obstacle. For optimizing the riding performance of an individual rider, these signals need to be refined and performed in balance. On the other side, an unbalanced rider is not able to ride a horse in balance. Instead, the horse needs to concentrate on balancing his or her rider. To enable a rider to perform at its individual peak, required equipment needs to provide both optimal support for the individual rider and safety for both the rider and the horse.

Man is a standing being where the foot is the crucial component for finding balance. A rider is always searching for the optimal balance for the task to be performed. A horse rider's weight is at least partially supported by a pair of stirrups suspended from the sides of a riding saddle. This weight is concentrated at the points of contact between the rider's feet and the stirrups. The contact surface is small, contributing over time to discomfort, fatigue, and poor balance. The position of the foot in the stirrup affects the position of the whole leg of the rider, and is crucial both when it comes to the riders position on the horse, and to the balance of the rider. The foot position is even more crucial since the contact surface area of a stirrup is so small. Yet another important factor is the form and the shape of a man's foot where the big toe naturally take most of the weight and also holds most of the balance during any type of movements.

The stirrup where the rider has his support for the foot is today not designed to provide the best possible support, which creates an unwanted imbalance in the rider that impairs the riding performance, and more importantly, in the long run becomes a major safety risk. Attempts have been made to improve the position and the support of a riders foot in a stirrup, and thus improving the balance of the rider. Stirrups with different types of foot plates are present, typically a fixed, inclined foot plate are provided to improve the position of the foot in the stirrup.

However, there is need of an improved stirrup enabled to be adapted to individual riders demands depending on factors like the riders experience, physics, strength in ankle joints and in knees, as well as on the body shape and strength of the horse, and on the present riding discipline.

SUMMARY

In embodiments herein, an adjustable stirrup arranged to be adjusted to an individual rider of a horse is provided. The stirrup comprises a stirrup support bracket, a foot tread and a stirrup leather mounting part arranged to receive the lower end sling of a stirrup leather. The stirrup is arranged to be adjusted in one or more of an x-, y- or z-axis direction.

In embodiments, the foot tread may be arranged to be rotated around the x-axis. Thereby the foot tread of the stirrup may be inclined in relation to the stirrup support bracket.

In embodiments, the stirrup support bracket may comprise a fixed part and a releasable part. The fixed part may be fixedly mounted to the foot tread and said releasable part is releasably attached to the foot tread (2).

In embodiments, the stirrup leather mounting part may be attached to the fixed part via a slider and a locking plate arranged on each side of the fixed part. The stirrup leather mounting part, the slider, the fixed part and the locking plate may be locked together by a locking bolt.

In embodiments, the fixed part of the support bracket may be provided with a notch, in which notch said slider is arranged to slide. Thereby the stirrup bracket may be enabled to be rotated around the z-axis.

In embodiments, the stirrup leather mounting part may be enabled to be rotated around the y-axis in relation to the stirrup support bracket.

In embodiments, the stirrup leather mounting part may be locked in a desired, rotated position in relation to the slider, by locking the slider, the fixed part and the locking plate together by the locking bolt.

In embodiments, the releasable part may be releasably attached to the foot tread by use of one on or more first magnets, arranged on the releasable part and adapted to interact with corresponding one or more second magnets arranged on the foot tread. Thereby the magnet attraction between the first magnets and the second magnets attaches the second part to the foot tread.

In embodiments, the releasable part may be loosened from the foot bracket if an applied force exceeds the magnetic force between the magnets and the magnets.

In embodiments, the part when loosened from the foot bracket may be caught by a catch strap.

In embodiments, the magnetic force applied by the magnets and the magnets in cooperation with the beveled surfaces and will guide the released part back into its original position if the applied force is released.

In embodiments, the stirrup may be arranged to be adjusted in all of the x-, y- and z-axis directions.

DETAILED DESCRIPTION

Embodiments herein will now be described with reference to the accompanied drawings.

Figure 1:
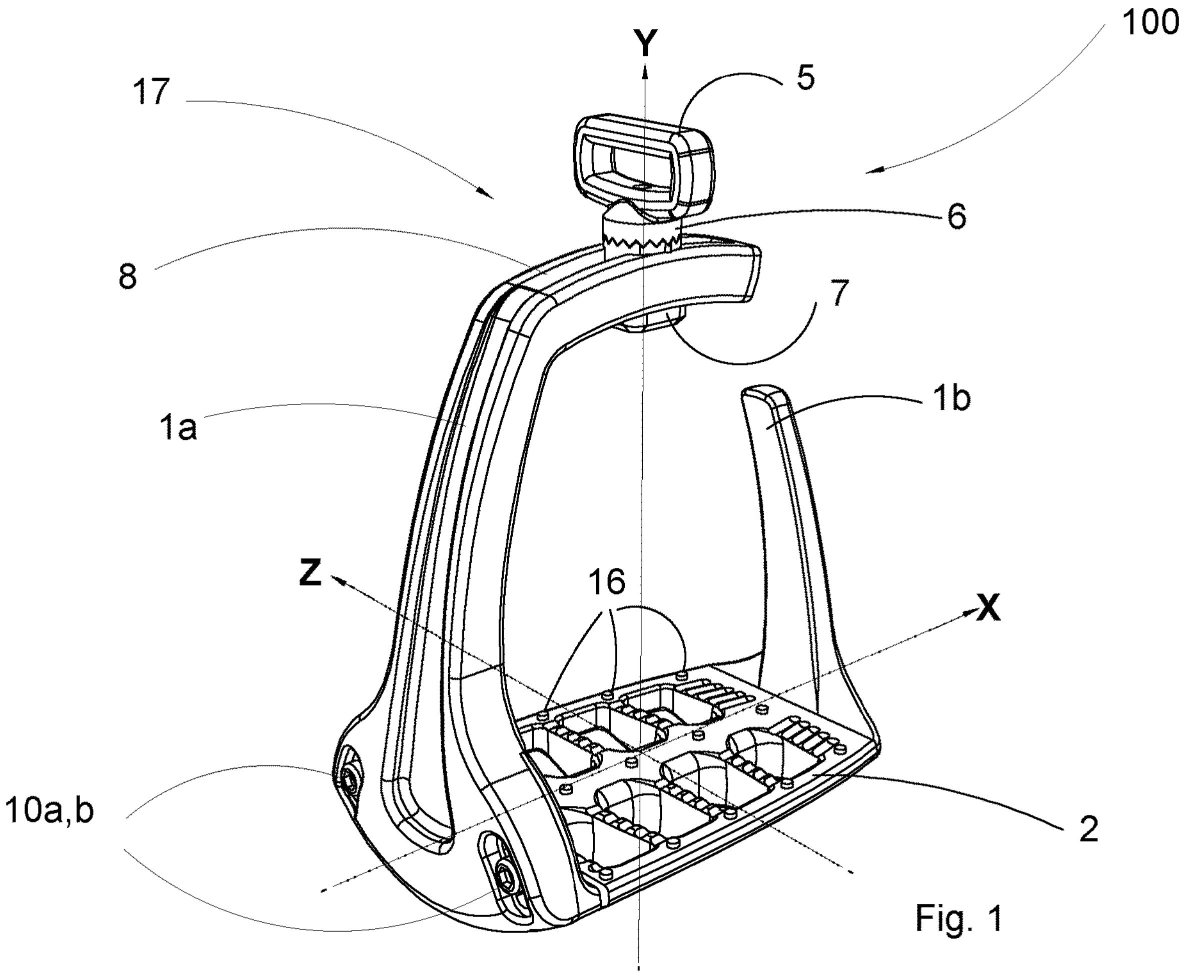
FIG. 1 is an overview of a stirrup in accordance with embodiments herein.

FIG. 1 is a brief overview of one exemplified embodiment of a stirrup 100. The stirrup 100 is arranged to be adjusted to an individual rider of a horse. The adjustable stirrup comprises a stirrup support bracket and a foot tread 2. The stirrup 100 is arranged to be adjusted in one or more of an x-, y- or z-axis direction. A stirrup leather mounting part 5 is arranged to receive the lower end sling of a stirrup leather substantially extending in the x-axis direction.

The stirrup is arranged to be adjusted different angles, whereby the stirrup 100 may be inclined in relation the horse. It is to be noted that in order to further increase the effect of adjusting the angles the form and the shape of the foot tread is important. The foot tread exemplified in the drawings is provided with a rough surface, that may be provided with knobs for example of metal, enabling high friction between the sole of the riding shoe and the foot tread. Thereby, the risk of slipping is minimized. Further, the foot tread may have an asymmetric form at least in part corresponding with the shape of a natural footprint, in order to provide for an increased support for the foot, and especially for the big toe. It has been seen that adjusting the angles of the stirrup is especially advantageous when it comes to improving the balance of the rider.

The stirrup support bracket comprises a first fixed part 1*a*, and a second releasable part 1*b*. The support bracket provide for good and firm support for the foot of the rider, but still being safe when it comes to risk that the foot may get stuck if the rider totally loses his balance. If the force against the releasable part 1*b* of the stirrup support bracket exceeds a predetermined force, the whole part 1*b* will be loosened from the foot tread. Thereby, there is no risk of the rider getting stuck. The foot bracket 2 is in this example provided with metal knobs 16 providing a good grip between foot bracket and the sole of the shoe of the rider. Yet another advantageous detail is that the foot bracket is provided with a plurality of large through holes. This enables dirt and particles to fall down due to gravity, and the foot bracket 2 will be prevented from being clogged with dirt, resulting in that the grip may be lost.

The angle of the foot bracket may be adjusted. This is done by loosen the locking bolts 10*a*, 10*b*, adjusting the foot bracket 2 in a desired angle, and locking the foot bracket 2 in the new position by tightening the locking bolts 10*a*, 10*b* again. This will be more explained later.

The stirrup further comprises a top holder 17 comprising the stirrup leather mounting part 5, a slider 6 and a locking plate 6. The top holder 17 is attached to the fixed part 1*a* of the support bracket via a locking bolt (not shown). The slider 6 is arranged to slide in a notch 8 in the fixed part 1*a* of the bracket. By moving the slider in relation to the bracket, the angle between the top holder 17 and the rest of the stirrup 100 may be adjusted.

Figure 2:
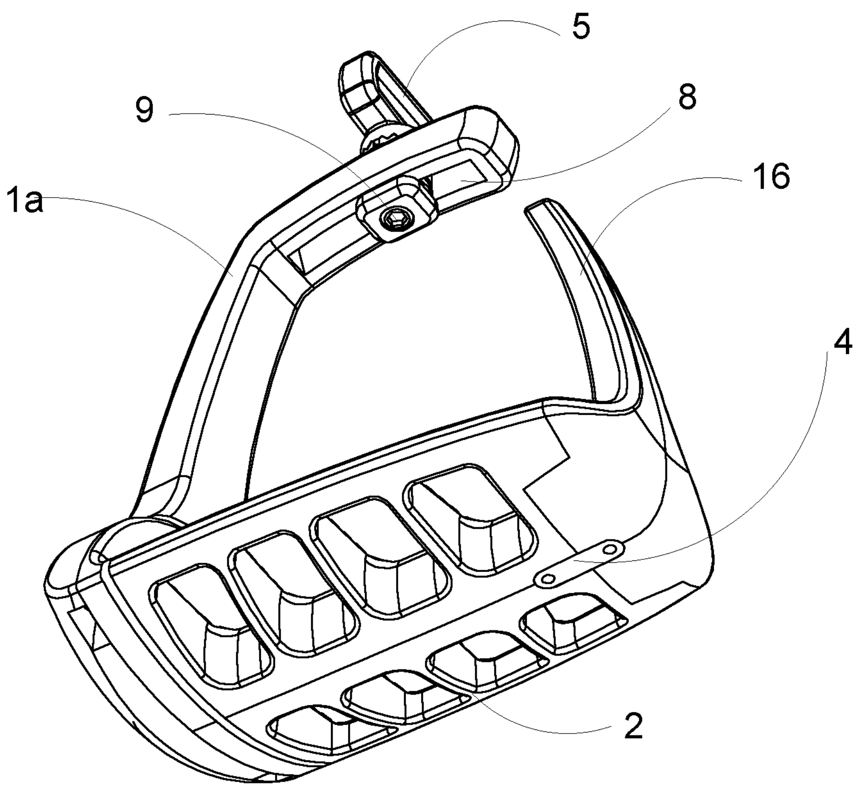
FIG. 2 shows the stirrup in FIG. 1 from underneath.

FIG. 2 shows the stirrup in FIG. 1 from underneath. As may be seen from the drawing, the top holder 17 is shown locked in the middle of the notch 8. If the bolt 9 is untightened, the slider 6 may be moved to a new, desired position and thereafter locked again. The stirrup 100 is further providing with a catch strap 4, holding the releasable part 1*b* and the foot bracket together. Especially, if the releasable part 1*b* is totally released due to heavy force, the catch strap 4 will prevent the part 1*b* from being lost. It is to be noted that if the force applied to the catch strap is too heavy, it will however break. Thus, all to ensure full safety to the rider if the balance is lost.

Figure 3:
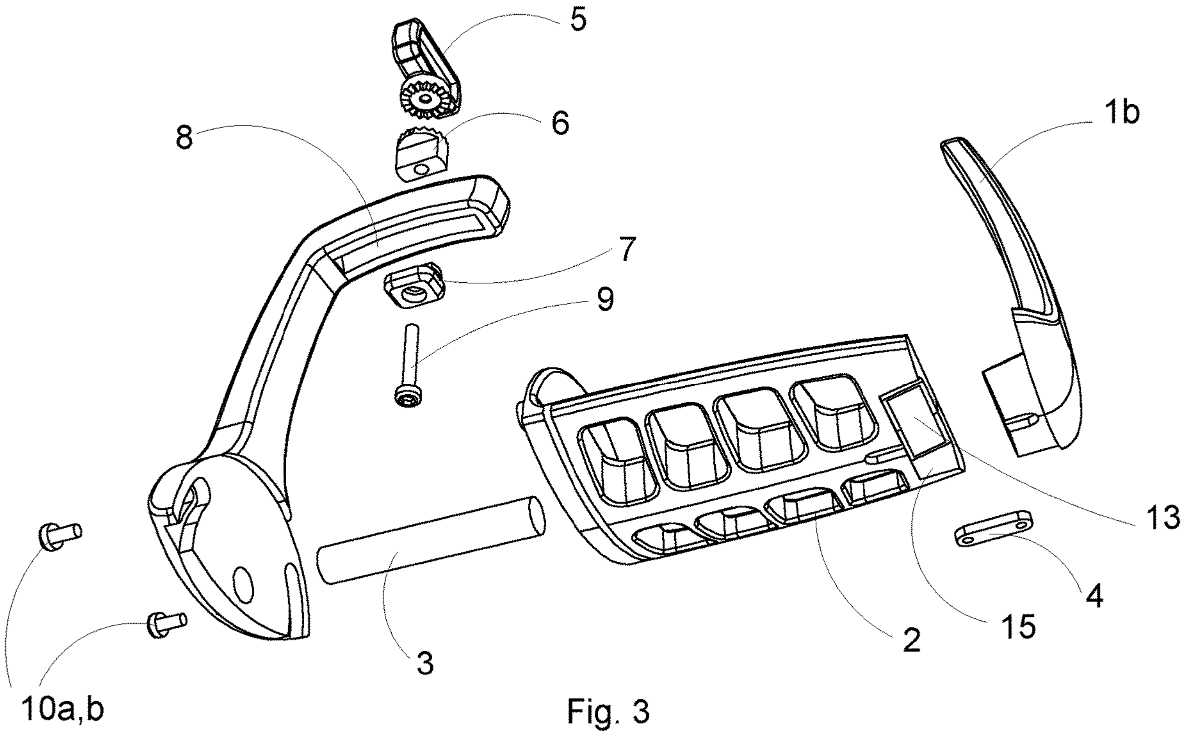
FIG. 3 is an exploded view of a stirrup in accordance with embodiments herein.
Figure 4:
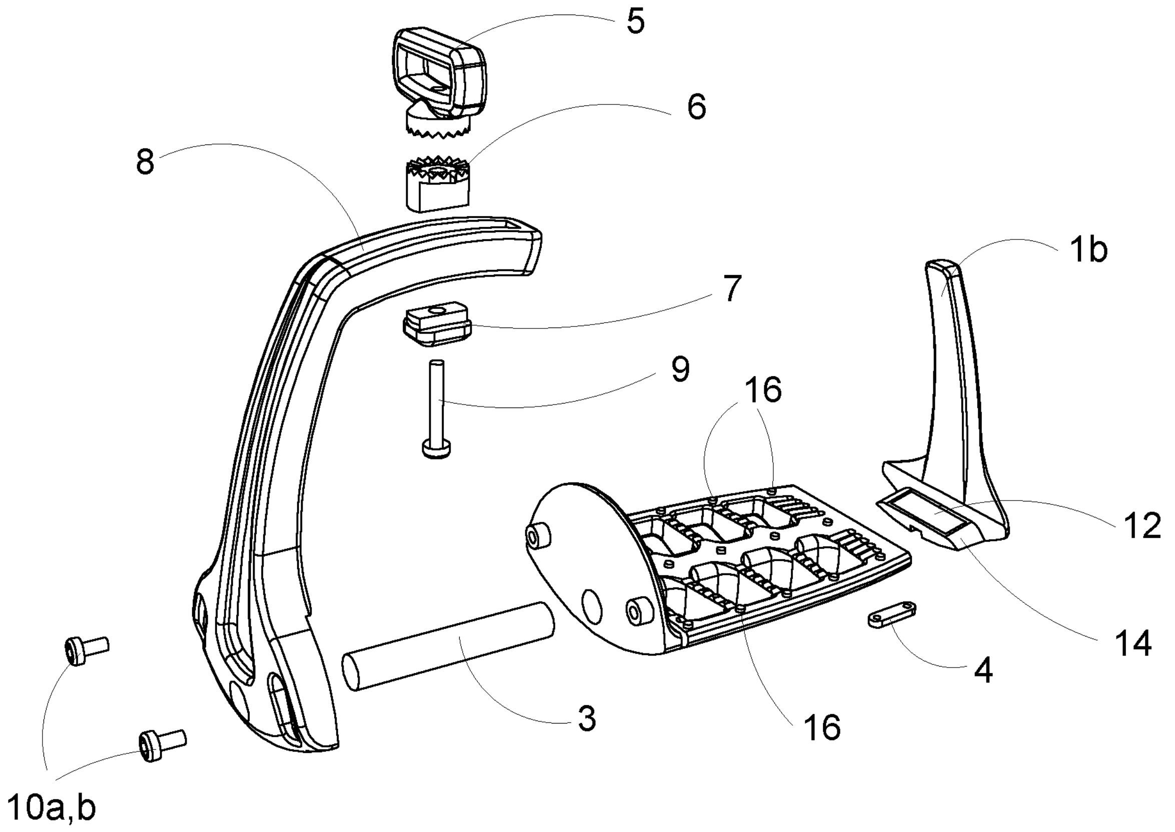
FIG. 4 is another exploded view of a stirrup in accordance with embodiments herein.

FIGS. 3 and 4 are detailed exploded views from different angles of one example of a stirrup in accordance with embodiments herein.

The foot tread 2 is attached to the stirrup support bracket 1 by use of an axis 3. The axis 3 is passed through the foot tread 2 and the foot tread 2 and the axis 3 are fixed to the fixed part 1*a* of the stirrup support bracket by use of locking bolts.

On one side of the foot tread, the angle of the foot tread may be adjusted by untighten the locking bolts 10*a, b*, rotate the foot tread 2 around the axis 3 and the x-axis until a desired angle is achieved, and thereafter tightening the locking bolts again. On the other side the foot tread is attached to the releasable part 1*b* of the stirrup support bracket. On the releasable part 1*b* first one or more magnets 12 are arranged. The magnets 12 are arranged to interact with one or more corresponding magnets 13 whereby a firm attachment is achieved, providing a safe support for the foot of the rider. Still, if the force applied to the releasable part exceeds the magnetic force between the magnets 12 and the magnets 13, the releasable part 1*b* with release from the foot tread 2. Since the part 1*b* loosens as a whole, the stirrup will be totally open at the side with no parts at all still extending upwards from the surface of the foot tread. Thereby, a very safe stirrup is provided.

Yet another advantageous feature is that the releasable part 1*b* will flip up as a hinge if the force applied to it stops. Thanks to the magnetic force applied by the magnets 12 and 13, and the beveled surfaces 14 and 15, the releasable part 1*b* will be guided back into its original position.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A stirrup arranged to be adjusted to an individual rider of a horse, comprising:
- a stirrup support bracket;
- a foot tread;
- a stirrup leather mounting part arranged to receive the lower end sling of a stirrup leather,
- wherein said stirrup is arranged to be adjusted in one or more of an x-, y- or z-axis direction, and
- wherein said stirrup bracket comprises a fixed part and a releasable part, wherein said fixed part is fixedly mounted to the foot tread and said releasable part is releasably attached to the foot tread.

2. The stirrup according to claim 1, wherein said foot tread is arranged to be rotated around the x-axis, whereby the foot tread of the stirrup is inclined in relation to the stirrup support bracket.

3. A stirrup arranged to be adjusted to an individual rider of a horse, comprising:
- a stirrup support bracket;
- a foot tread;
- a stirrup leather mounting part arranged to receive the lower end sling of a stirrup leather, wherein said stirrup is arranged to be adjusted in one or more of an x-, y- or z-axis direction, and wherein said stirrup leather mounting part is attached to said fixed part via a slider and a locking plate arranged on each side of the fixed part and wherein the stirrup leather mounting part, the slider, the fixed part and the locking plate are locked together by a locking bolt.

4. The stirrup according to claim 3, wherein said fixed part of the support bracket is provided with a notch, in which notch said slider is arranged to slide, whereby the stirrup bracket is enabled to be rotated around the z-axis.

5. The stirrup according to claim 1, wherein said stirrup leather mounting part is enabled to be rotated around the y-axis in relation to the stirrup support bracket.

6. The stirrup according to claim 3, wherein said stirrup leather mounting part is locked in a desired, rotated position in relation to the slider, by locking the slider, the fixed part and the locking plate together by the locking bolt.

7. The stirrup according to claim 1, wherein said releasable part is releasably attached to the foot tread by use of one or more first magnets, arranged on the releasable part and adapted to interact with corresponding one or more second magnets arranged on the foot tread, whereby the magnet attraction between the first magnets and the second magnets attaches the second part to the foot tread.

8. The stirrup according to claim 7, wherein the releasable part is loosened from a foot bracket if an applied force exceeds the magnetic force between the first magnets and the second magnets.

9. The stirrup according to claim 1, wherein the releasable part when loosened from a foot bracket is caught by a catch strap.

10. The stirrup according to claim 8, wherein the magnetic force applied by the first magnets and the second magnets in cooperation with beveled surfaces will guide the released part back into its original position if the applied force is released.

11. The stirrup according to claim 1, wherein said stirrup is arranged to be adjusted along all three spatial directions, namely the x-, y- and z-axes.

* * * * *